United States Patent [19]

Kelch et al.

[11] 3,818,506

[45] June 18, 1974

[54] ARRANGEMENT FOR COMPENSATING FRICTION-INDUCED ELECTROSTATIC FORCES IN A READ-OUT DEVICE FOR DISC-SHAPED RECORD CARRIERS

[75] Inventors: Heinz Kelch, Buchenberg; Eduard Schuh, Villingen, both of Germany

[73] Assignee: Kienzle Apparate GmbH, Villingen/Schwarzwald, Germany

[22] Filed: July 7, 1972

[21] Appl. No.: 269,562

[30] Foreign Application Priority Data

July 10, 1971 Germany ........................... 2134504

[52] U.S. Cl. ................................ 360/130, 360/102

[51] Int. Cl. .......................................... G11b 15/64

[58] Field of Search..... 346/137; 274/9 B, 42, 39 R, 274/39 A; 340/174.1 E; 179/100.2 P, 100.2 A

[56] References Cited

UNITED STATES PATENTS

| | | | |
|---|---|---|---|
| 3,178,719 | 4/1965 | Shapiro | 340/174.1 E |
| 3,213,461 | 10/1965 | Godderd | 340/174.1 E |
| 3,225,338 | 12/1965 | Kelner et al. | 340/174.1 E |
| 3,405,405 | 10/1968 | Boisseuzin et al. | 340/174.1 E |
| 3,478,341 | 11/1969 | Trimple et al. | 340/174.1 E |

*Primary Examiner*—Vincent P. Canney
*Attorney, Agent, or Firm*—Michael S. Striker

[57] ABSTRACT

A holder holds, automatically centers and rotates a disc-shaped record carrier having two opposite sides. A sensing head is located one of the sides and a supporting element is located adjacent the other of these sides opposite the sensing head to support the record carrier against deflection. A nozzle is arranged proximal to the sensing head and operative for directing a stream of compressed air against the record carrier, the nozzle and the supporting element being movable relative to one another in direction substantially normal to the general plane of the record carrier.

6 Claims, 2 Drawing Figures

ARRANGEMENT FOR COMPENSATING FRICTION-INDUCED ELECTROSTATIC FORCES IN A READ-OUT DEVICE FOR DISC-SHAPED RECORD CARRIERS

BACKGROUND OF THE INVENTION

The present invention relates generally to a device for compensating electrostatic forces originating due to friction, and more particularly to an arrangement for compensating friction-induced electrostatic forces in a read-out device for disc-shaped record carriers.

Read-out devices are known for reading recorded material produced on disc-shaped record carriers, for instance those which are employed in so-called tachographic apparatus, that is devices utilized in automobiles where the disc records the speed of the automobile during a predetermined period of time, plotted against time on the disc. Usually, the recordings are made on the disc in several concentric tracks and produced in form of lines or the like which are formed in the respective tracks. To avoid misunderstandings it is pointed out that such disc-shaped record carriers are used not only in the recording of automobile speeds, but also to record information in industrial production, for instance to record times during which machines are stopped or in operation, to record quantities of articles produced, and to the like. Particularly in industrial applications the amount of information thus recorded can be retrieved, that is read and placed in usable form, only by the enployment of mechanized read-out equipment.

Such equipment has been proposed in the prior art, and its employment has been found to substantially simplify and speed up the retrieval of information recorded on disc-shaped record carriers and other record carriers. The prior-art proposal is of a device in which the record carrier of disc-shaped configuration is dropped onto a structure having an opening, and the record carrier is sensed by photoelectric means through this opening, automatically centered and retained in position and thereupon rotated for reading-out of the information recorded on it. When the read-out process is completed the record carrier is released and drops out of the opening through the influence of gravity, that is under its own weight.

This prior-art device operates very satisfactorily, except for one difficulty. It is known that in such a device the input arrangement is the slowest member in the reading-out chain, where reading-out of the recorded information is effected electronically and at high speed. This is the problem with the prior art where the input device, that is the device which supplies the record carrier for subsequent reading-out, is not fully satisfactory and where in particular the movement of the carrier in the read-out device—for instance its removal after the read-out process is completed—are not properly controlled for maximum effectiveness. This latter feature in particular, namely the dropping of the carrier out of position after the read-out process is completed, under the influence of its own weight, is problematical because during turning for read-out purposes the carrier is frequently electrostatically charged and then either prevented from automatically dropping out under its own weight or at least retarded in so doing.

The electrostatic charging of the carrier takes place predominantly during the reading-out process, due to the friction generated as the record carrier moves over the supporting element or table which engages one side of the carrier and has the purpose of preventing the carrier from yielding and fluttering, to assure that a precisely defined distance is obtained between the record carrier and the sensing head which reads out the recorded information. The record carriers are rotated at a relatively high speed during the read-out process and as a result of this the electrostatic forces generated can become so great that it has been found that the carrier may actually be retained by such force in position and will not fall out of the equipment to make place for the next carrier. It has been attempted to overcome this problem to displace the supporting table after the read-out process is completed, that is to move it away from the record carrier. This, however, also has not been satisfactory because the record carrier is sufficiently yieldable to bend and follow the movement of the supporting table while adhering thereto under the influence of the electrostatic force. Alternately it has been observed that even if it comes free from the supporting table, if the electrostatic force is sufficiently strong the carrier will subsequently be attracted to the supporting table again after the latter has been moved away from it.

It is clear, therefore, that the prior-art devices require further improvements.

SUMMARY OF THE INVENTION

It is, accordingly, an object of the invention to overcome the disadvantages of the prior art and to provide the improvements which have been indicated above as desirable.

More particularly it is an object of the invention to provide an improved arrangement of the character herein described, which is capable of overcoming the electrostatic forces generated by friction during the reading-out of record carriers, especially disc-shaped record carriers.

Another object of the invention is to provide such an arrangement in which it is assured that the record carriers will reliably and without any significant delay, or at least with an always equal delay, be released from the device after completion of the reading-out process.

In pursuance of these objects, and of others which will become apparent hereafter, one feature of the invention resides, in an arrangement of the character hereindescribed, in a combination which comprises holding means for holding and rotating a disc-shaped record carrier having two opposite sides. Sensing means is provided adjacent one of the sides and supporting means is provided adjacent the other of the sides opposite the sensing means for supporting the record carrier opposite the sensing means against the deflection. Nozzle means is provided adjacent the one side where the sensing means is located and is operative for directing a stream of air against the one side in the region of the sensing means, at one of the supporting means and nozzle means being movable relative to the other in direction substantially normal to the general plane of the record carrier.

A currently preferred embodiment of the invention provides for the stream of compressed air to be supplied by a compressor, and for the nozzle means to be in form of an annular gap provided between the sensing means which is in form of a sensing head and a sleeve surrounding the sensing head.

It will be appreciated that the present invention achieves its objects in a very simple manner and in a manner which requires little or no maintenance work. By resorting to the present invention the record carriers will have neither contact with the recording head nor with the retracted supporting means or supporting table after the read-out process is completed, and will therefore be able to drop out of the device under the influence of their own weight without any hindrance or contact. This means that the overall operational speed of the device, and therefore its effectiveness, are substantially increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
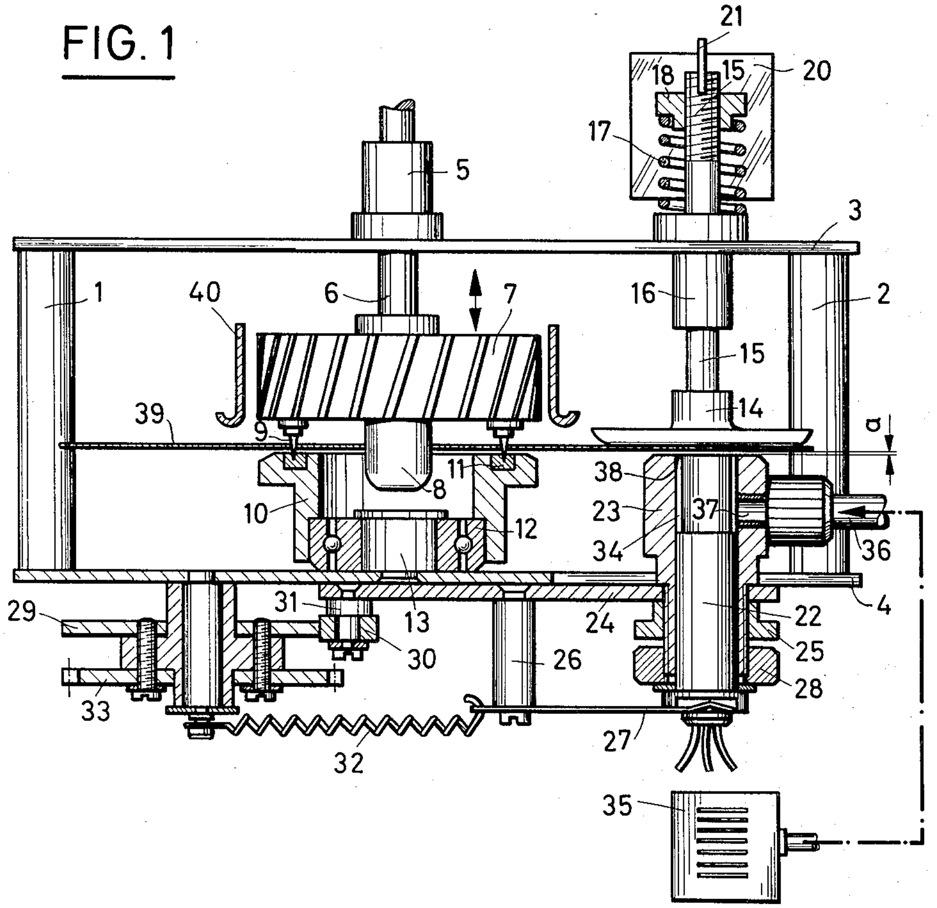
FIG. 1 is a fragmentary sectional view illustrating a device incorporating an embodiment of the invention, illustrated in the reading-out mode.

The device illustrated in FIG. 1 has been shown only insofar as it is necessary for an understanding of the invention. Plates 3 and 4 are provided which are connected with one another by means of bolts 1 and 2. A sleeve 5 is provided on the plate 3 and carries a centering shaft 6 which is axially displaceable, the means provided for this purpose being omitted for the sake of clarity as not forming a part of the invention.

An element 7 is provided on the shaft 6 and carries on the one endface a centering projection 8. The same endface carries needles 9 with which there is associated a rubber ring 11 or the like provided on a support 10 for the record carrier. The support 10 is turnably journalled on a shaft 13 which is mounted on plate 4, ball bearings being provided for journalling the support 10.

The plate 3 carries not only the shaft 6 but a disc-shaped supporting means or table 14 which is mounted longitudinally displaceable in a sleeve 16 via a rod 15, being under the influence of a restoring spring 17. A knurled nut 18 is provided for adjusting the force exerted by the spring 17. An electromagnet 20 displaces the table 14, the magnet 20 having an armature 21 which is pivoted to the rod 15.

The reading-out of information from the record carrier is effected by the sensing head 22 which utilizes preferably photoelectric means for the reading-out operation, such photoelectric means being well known and not being illustrated in detail as not forming a part of the present invention. The head 22 is located at one side of the record carrier and the table 14 at the opposite side, being located opposite the head 22. The head 22 is secured to the plate 4, a sleeve 23 being provided which is connected to a member 24 via a nut 25. The member 24 in turn is longitudinally shiftably guided in a dove-tail guide (not shown in FIG. 1) provided in plate 4. A post 26 connects a leaf spring 27 with the member 24, retaining the head 22 in the sleeve 23. A knurled nut 28 serves to provide for a fine adjustment of the position of the head 22 in the sleeve 23.

The switching of the head 22 to the various tracks on the respective record carriers is effected by means of a cam disc 29 which is turnably operative to act on the member 24 and is turnably journalled on a shaft 31 provided in the member 24. A restoring spring maintains the roll 30 in operative engagement with the cam disc 29 which is driven via a gear 33, the latter being coaxial with the cam disc 29 and connected therewith but it cannot rotate relative thereto.

In accordance with the present invention there is provided an annular gap 34 constituting a nozzle, between the head 22 and the sleeve 23 over a certain length which does not influence the holding function of the sleeve 23 for the head 22. The end faces of the sleeve 23 and of the head 22 are preferably located in a common plane and the gap 34 receives a stream of compressed air from a compressor 35 via the conduit 36 and a channel 37. This stream of compressed air is discharged from the nozzle 38 constituted by the gap 34.

In operation of the device a disc-shaped record carrier is supplied in known manner and roughly centered by means of appropriate abutments which are not shown. It is then sensed by a light beam or the like, and the beam when interrupted triggers the centering and retaining operation as a result of which the record carrier is moved to the position shown in FIG. 1 in which the projection 8 extends through the centering hole of the record carrier and the needles 9 extend through the record carrier into the rubber ring 11 in the support 10 which rotates with the carrier. Details of this have not been illustrated, and similarly details of how the wheel 7 is driven have not been illustrated, because they are not essential for an understanding of the invention. It is simply necessary to recall that the wheel 7 turns continuously so that the record carrier is already entrained and rotated while it is being centered and engaged, so that it is ready for reading-out as soon as it is properly engaged.

When the engagement is completed a non-illustrated switch has been closed which indicates to a similarly non-illustrated program device that the record carrier is now in position for reading-out. At the same time the electromagnet 20 is energized and the table 14 is displaced towards the record carrier 39. Now the reading-out of the tracks on the record carrier can begin and a rotation counter stops recording after it turns through 360° and activates a coupling associated with the cam disc 29 to displace the head 22 to the next track on the record carrier. All of this is known per se.

During the reading-out operation the stream of air issuing at relatively high speed from the nozzle 38 is directed against the rotating record carrier 39. This has, inter alia, the additional advantage that the distance *a* of the head 22 with respect to the record carrier 39 would always be identical even if the record carrier should happen to be bent or wavy. In addition, particulate contaminants on the record carrier, which might adversely influence the reading-out process, are blown off. Thus, optimum reading-out accuracy is obtained by pressing the record carrier with the airstream against the table 14.

However, these advantages are only incidental to the primary advantage sought and obtained according to the present invention. The effect of the aerodynamic paradox is obtained, as sought according to the present invention, only when a certain distance *b* (see FIG. 2) is obtained from the record carrier, when the retaining arrangement for the record carrier is released. To utilize this effect it is immaterial whether the table 14, the nozzle 38 and the head 22, or both the table 14 and the nozzle 38 are moved in direction normal to the plane of the record carrier 39. In any event, after the reading-out process is complated, the program control arrangement retracts the centering shaft and the record carrier 39 is released via the stripper 40. At the same time the table 14 may be retracted, so that the distance between the record carrier 39 and the end face of the head 22 and the sleeve 23 increases because the record carrier 39 adheres to the table 14 due to its electrostatic charging.

In most instances the record carrier would adhere to the table 14 even if the table were to be retracted only after the record carrier is released by the retaining devices.

Figure 2:
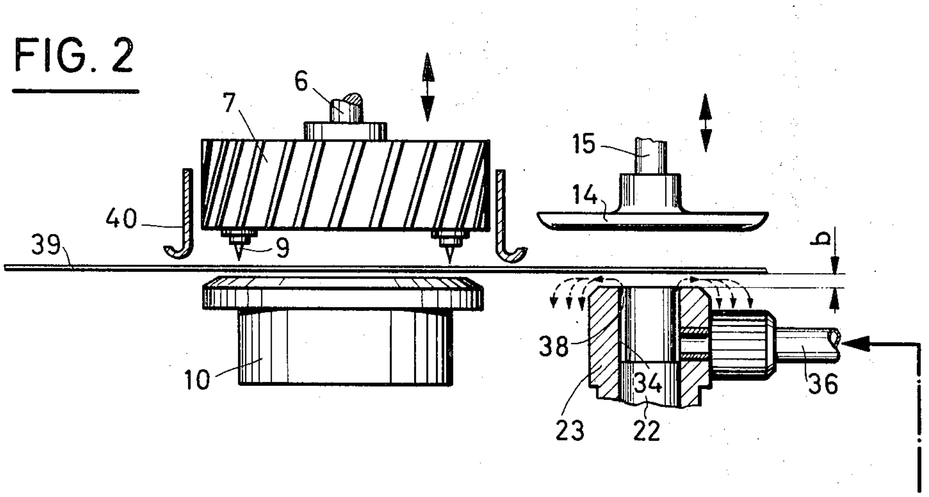
FIG. 2 illustrates the device of FIG. 1 at the time the carrier is released after reading-out is completed.

When the record carrier is now retracted by a certain distance from the nozzle 38, a distance which is greater than that required during the read-out operation, a balance obtains between the component of the pressing force exerted at this distance by the airstream and the suction effect due to the aerodynamic paradox on the one hand, and the electrostatic retention force on the other hand. As a result of this the record carrier 39 comes loose from the table 14 and swings into the position (distance *b* as shown in FIG. 2) in which the pressing force of the airstream and the suction effect which result from the difference between the atmospheric pressure on the one hand and the underpressure at the side of the record carrier which faces away from the nozzle on the other hand, are in equilibrium and in this condition the record carrier can fall without any interference or retention out of the device, because the force of gravity acts normal to the aerodynamic force. The device is now ready for the insertion of the next record carrier to be read-out.

It will be understood that each of the elements described above, or two or more together, may also find a useful application in other types of constructions differing from the types described above.

While the invention has been illustrated and described as embodied in a device for compensating the electrostatic forces originating due to friction in the reading-out of a record carrier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. In an arrangement of the character described, a combination comprising holding means for holding and rotating a disc-shaped record carrier having two opposite sides; sensing means adjacent one of said sides; supporting means adjacent the other of said sides opposite said sensing means for supporting said record carrier opposite said sensing means against deflection, with resultant electrostatic charging of said record carrier due to friction with said supporting means, and electrostatic adherence of said record carrier to the supporting means; and nozzle means adjacent said one side and operative for directing a stream of air against said one side in the region of said sensing means, at least one of said supporting means and nozzle means being movable relative to the other in direction substantially normal to the general plane of said record carrier so that, when said nozzle means and said record carrier adhering to said supporting means reach a requisite distance from one another, the suction effect of the air escaping from between them will pull said record carrier loose from said supporting means.

2. A combination as defined in claim 1; and further comprising compressor means for producing a stream of compressed air and supplying the same to said nozzle means.

3. A combination as defined in claim 2, said sensing means comprising a sensing head, and a sleeve surrounding said sensing head; and wherein said sensing head and sleeve define with one another one annular clearance constituting said nozzle means, said compressor means supplying said stream of air to said annular clearance.

4. A combination as defined in claim 3, said sleeve including a flange having a major surface facing towards said record carrier, and said sensing head having an endface also facing toward said record carrier and being located substantially in the plane of said major surface.

5. A combination as defined in claim 1, said holding means including centering means for centering respective record carriers.

6. A combination as defined in claim 5, said holding means further including engaging means for engaging and releasing respective record carriers.

* * * * *